United States Patent [19]

Doi et al.

[11] Patent Number: 5,450,922
[45] Date of Patent: Sep. 19, 1995

[54] AUTOMOBILE POWER PLANT MOUNTING STRUCTURE

[75] Inventors: Nobuo Doi; Koji Horikawa; Kiyonori Nagato; Takeshi Ota, all of Hiroshima, Japan

[73] Assignee: Mazda Motor Corporation, Hiroshima, Japan

[21] Appl. No.: 71,639

[22] Filed: Jun. 4, 1993

[30] Foreign Application Priority Data

Jun. 4, 1992 [JP] Japan .................. 4-144382

[51] Int. Cl.$^6$ .............................................. B60K 5/04
[52] U.S. Cl. .................................................. 180/297
[58] Field of Search ............. 180/291, 297, 54.1, 180/312, 300; 123/55 VS, 57 S, 59 R

[56] References Cited

U.S. PATENT DOCUMENTS

| | | | |
|---|---|---|---|
| 5,251,720 | 10/1993 | Hasetoh et al. | 180/297 |
| 5,257,675 | 11/1993 | Araki et al. | 180/297 |
| 5,287,942 | 2/1994 | Maebayashi et al. | 180/297 |
| 5,305,848 | 4/1994 | Akutagawa et al. | 180/297 |

FOREIGN PATENT DOCUMENTS 1-226429  9/1989  Japan .

*Primary Examiner*—Richard M. Camby
*Attorney, Agent, or Firm*—Keck, Mahin & Cate

[57] ABSTRACT

A power plant is mounted on both sides in a transverse direction by mounts. Each of the mounts is placed within a triangle defined by a point on a primary inertial axis of the power plant on the transverse side of the power plant, a point at a node of power plant bending vibrations in a twisting mode or in a fluctuation mode, and a point defined by the intersection of a perpendicular line passing through the primary inertial axis and a horizontal line passing through the node of vibrations.

6 Claims, 4 Drawing Sheets

AUTOMOBILE POWER PLANT MOUNTING STRUCTURE

BACKGROUND OF THE INVENTION

1. Field of the Invention

This invention relates to a power plant mounting structure for mounting a power plant in an automotive vehicles.

2. Description of Related Art

Typically, mounts for a power plant used with an automotive vehicle are positioned on points in the inertial axes of the power plant on both sides of the power train. Such a placement of the power plant mounts is described in, for instance, Japanese Unexamined Patent Publication No. 1-226429.

The placement of power plant mounts on the inertial axes on both sides of the power plant is effective in reducing rolling and vibrations, attributable to resonance of the power plant as a rigid body during engine idling, of the power plant. However, with a power plant layout in which an engine and an transmission are placed in parallel, the power plant is subjected to so-called power plant bending (PPB) vibrations in a twisting mode and a fluctuation mode, which cause a confined or buzzing sound or noise within the vehicle compartment. Such a confined or buzzing noise cannot be eliminated by simply placing the mounts on the primary inertial axes of the power plant.

SUMMARY OF THE INVENTION

An objective of this invention is to provide a mounting structure for mounting a power plant in a vehicle compartment in which idling related vibrations and power plant bending (PPB) related vibrations are simultaneously reduced.

The above object of the present invention is achieved by providing a mounting structure for mounting a power plant having an engine and a transmission. The engine is placed with its crankshaft extending transversely with respect to the vehicle body. The transmission is disposed with input and output shafts in parallel to the crankshaft of the engine and is adjacent to the engine in the lengthwise direction of the vehicle body. A mounting position is located within a triangle which is bound by a point on a primary inertial axis of the power plant on one side of the power plant in the transverse direction, a point at a node of power plant bending (PPB) vibrations in a twisting mode or in a fluctuation mode (which shall mean and refer to a vibration mode in which vibrations cause the power train to bend as a rigid system so as to increasingly and decreasingly vary a distance or gap between the engine and transmission), and an intersection of a vertical line which passes the primary inertial axis and a horizontal line which passes through the nodal point. Especially, when idling-related vibrations are considered more important, the mounting position is established close to the vertical line within the triangle.

On one side of the power plant where the crankshaft is disposed (which is referred to as a crankshaft side for simplicity), when a timing pulley is located within the triangle, the mounting position on the crankshaft side is established on an axis of the engine crankshaft so as to support an outer one end of a pulley shaft, i.e. an extension of the crankshaft, with a crankshaft side mount bracket, thereby supporting the pulley on both sides thereof. On the other hand, on the other side of the power plant, opposite to the crankshaft side, (which is referred to as an output side), the mounting position on the output side is established adjacent to a clutch housing of the transmission, at which the clutch housing is formed with a mount flange for disposing an output side mount bracket through a mount shaft.

With the power plant mounting structure of the invention, the power plant is supported by crankshaft side and output side mounts, each of which is positioned within a triangle bounded by a point on a primary inertial axis of the power plant on one side of the power plant in the transverse direction, a point at a node of power plant bending (PPB) vibrations in a twisting mode or in a fluctuation mode, and an intersection of a perpendicular line which passes the primary inertial axis and a horizontal line which passes through the node of vibrations. Since the mounting position is established in close proximity both to the primary inertial axis and to the node of vibrations in a twisting mode or in a fluctuation mode, the buzzing fluttering sounds, confined within the vehicle compartment, generated by idle-related vibrations and power plant bending-related vibrations can be reduced.

In addition, particularly through the establishment of the mounting position close to the perpendicular line within the triangle, the power plant is maintained well balanced at the position of center of gravity accompanying an effective reduction of idling-related vibrations. Since power plant bending-related vibrations are at low frequencies, it is possible to establish mounting positions giving serious attention to idling-related vibrations.

When a pulley is located within the triangle on the crankshaft side of the power plant, the mounting position is established on the axis line of the pulley shaft to support the pulley on its one side, so that the pulley is supported on its opposite sides by a bracket mount and an engine block, thereby improving support rigidity. Furthermore, on the output side of the power plant, the mounting position is established adjacent to a clutch housing of the transmission so as to place the mount bracket on the mounting flange formed integral with the clutch housing. This mounting flange reinforces the clutch housing, so as to increase the structural rigidity against bending of the clutch housing.

BRIEF DESCRIPTION OF THE DRAWINGS

The above and other objects and features of the present invention will be fully and clearly understood from the following detailed description with respect to a preferred embodiment thereof when considered in conjunction with the accompanying drawings, in which.

DESCRIPTION OF THE PREFERRED EMBODIMENT

Because an engine and a transmission are well known in the art, the present description will be directed in particular to elements forming part of, or cooperating directly with, a power plant mounting structure in accordance with the present invention. It is to be understood that elements not specifically shown or described can take any form well known to those in the automobile art.

The term "front" as used herein shall mean and refer to the forward direction of the vehicle body, and the term "rear" as used herein shall mean and refer to the rearward direction of the vehicle body.

Figure 1:
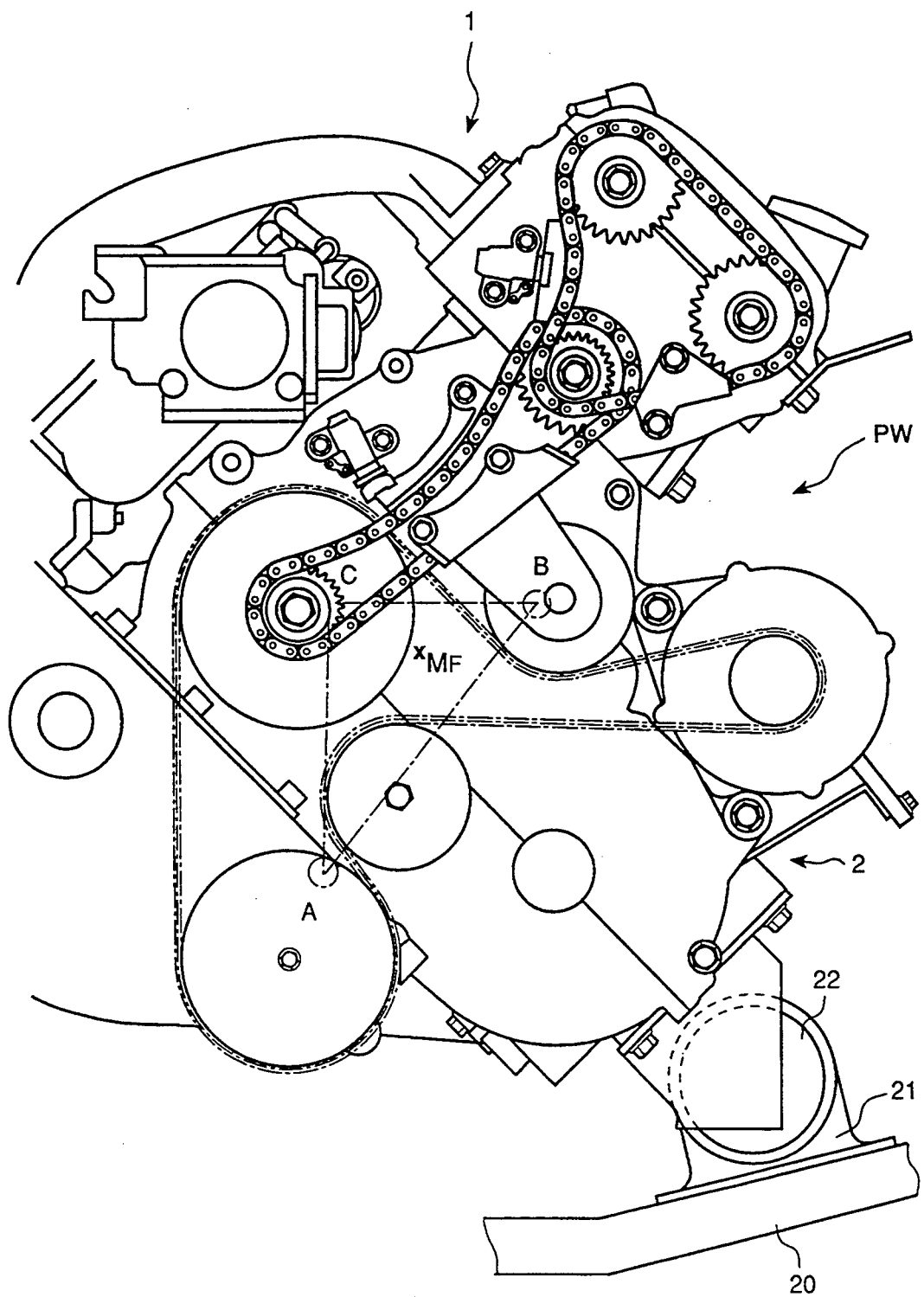
FIG. 1 is a front end view of a power plant in accordance with a preferred embodiment of this invention.
Figure 2:
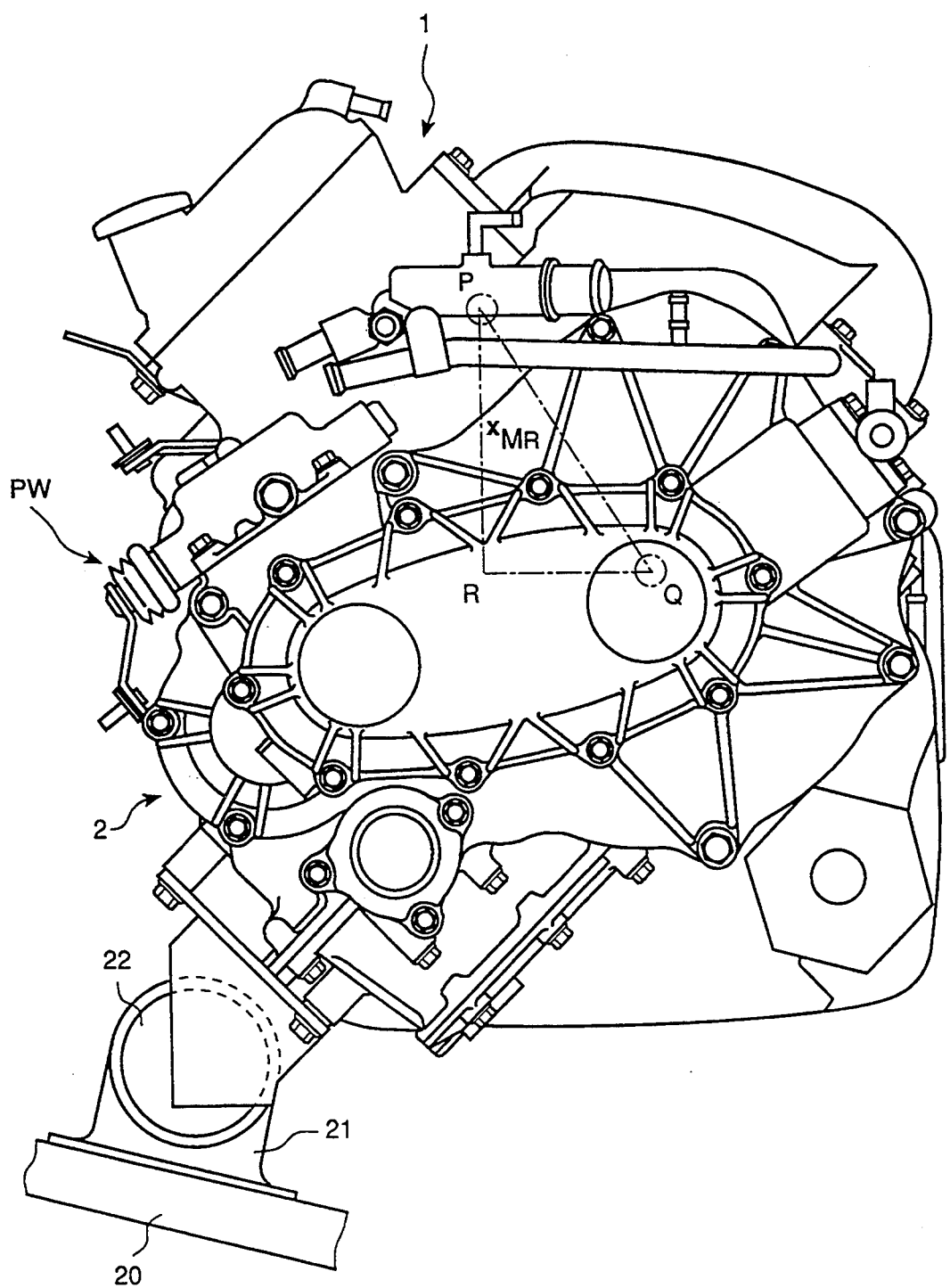
FIG. 2 is a rear end view of the power plant shown in FIG. 1.

Referring to the drawings in detail, and in particular, to FIGS. 1 and 2, a power plant PW in accordance with a preferred embodiment of the present invention is shown, which has an engine 1 and a transmission 2 with its input and output shafts (not shown) disposed in parallel to an engine crankshaft. The engine 1, which is called a rearward slant type, is, in turn, inclined toward the rear relative to the lengthwise direction of the vehicle body (not shown). A primary inertial axis of the power plant PW is located at a position A, shown by dotted broken line in FIG. 1, on the crankshaft side end face and at a position P, shown by dotted broken line in FIG. 2, on the output side end face. In addition, a node of power plant bending (PPB) vibrations is located at a position B, shown by dotted broken line in FIG. 1, on the crankshaft side end face and at position Q, shown by broken line in FIG. 2, on the output side end face.

Figure 3A:
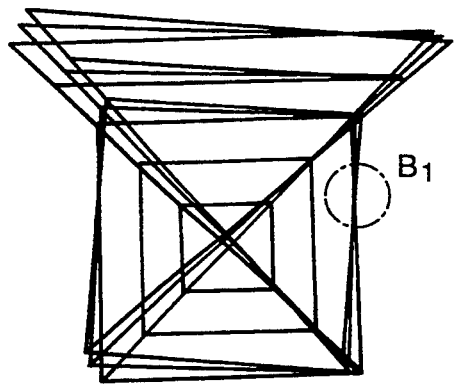
FIGS. 3A and 3B are analytical diagrams of a PPB vibration mode at the front end of the power plant.
Figure 3B:
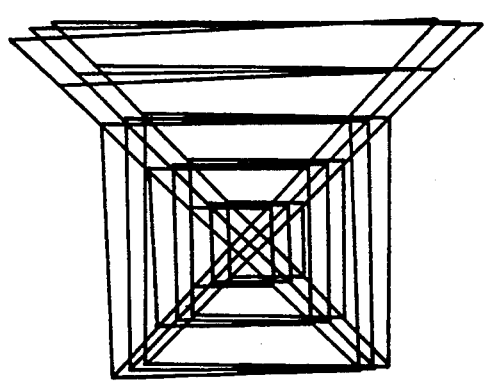
Figure 4A:
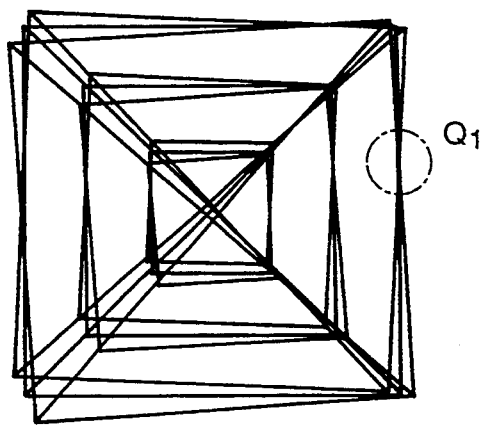
FIGS. 4A and 4B are analytical diagrams of a PPB vibration mode at the rear end of the power plant.
Figure 4B:
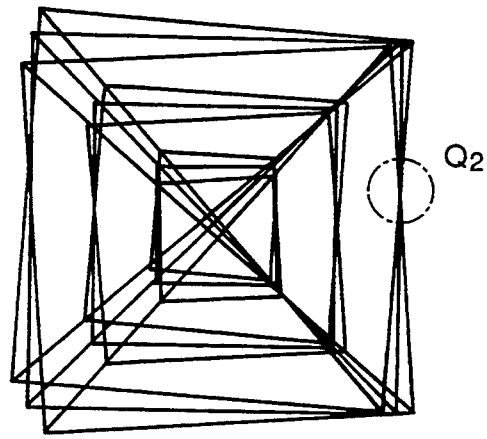

Referring to FIGS. 3A and 3B, and 4A and 4B depicting power plant bending (PPB) vibrations of the power plant PW described above, power plant bending (PPB) vibrations on the crankshaft side are depicted in a twisting mode in FIG. 3A and in a fluctuation mode in FIG. 3B. Similarly, power plant bending (PPB) vibrations on the output side are depicted in the twisting mode in FIG. 4A and in the fluctuation mode in FIG. 4B. Power plant bending (PPB) vibrations occur with a node of vibrations in the twisting mode on the crankshaft side at a point $B_1$ (FIG. 3A), a node of vibrations in the twisting mode on the output side at a point $Q_1$ (FIG. 4A), and a node of vibrations in the fluctuation mode on the output side at a point $Q_2$ (FIG. 4B), where there are no respective occurrences of displacements in position. However, power plant bending (PPB) vibrations in the fluctuation mode shown in FIG. 3B do not generate any node of vibration on the crankshaft side. The nodes $Q_1$ and $Q_2$ of power plant bending (PPB) vibrations on the output side are substantially in the same position in the twisting mode and in the fluctuation mode. Therefore, utilization is made of the node $B_1$ of power plant bending (PPB) vibrations and either one of the nodes $Q_1$ and $Q_2$ power plant bending (PPB) vibrations as a node B for the crankshaft side and a node Q for the output side, respectively.

In the power plant mounting structure, the crankshaft side mounting position is located at, for example, a position $M_F$ marked by X in FIG. 1, which lies within a triangle bounded by the point A on the primary inertial axis, the node B of power plant bending (PPB) vibrations, an intersection C of a perpendicular line passing through the point A and a horizontal line passing through the node B of power plant bending (PPB) vibrations. Similarly, the output side mounting position is located at, for example, a position $M_R$ marked by X in FIG. 2, which lies within a triangle bounded by the point P on the primary inertial axis, the node Q of power plant bending (PPB) vibrations, and an intersection R of a perpendicular line passing the point P and a horizontal line passing the node Q of power plant bending (PPB) vibrations. In view of the harmonization of mounting positions for low frequency idling vibrations and power plant bending (PPB) vibrations, the crankshaft side mounting position and the output side mounting position can be effectively placed in close proximity to a straight line A–B which passes the point A and the node B and to a straight line P–Q which passes the point P and the node Q, respectively, still within the triangles ABC and PQR. However, such a placement of the crankshaft side and output side mounting positions renders the power plant PW difficult to become transversely balanced, resulting in the instability of the power plant PW upon an occurrence of vehicular collision. Thus, each mounting position is effectively placed in close proximity to the perpendicular line A–C or P–R, which passes through the primary inertial axis, within a permissible structural limits.

Figure 5:
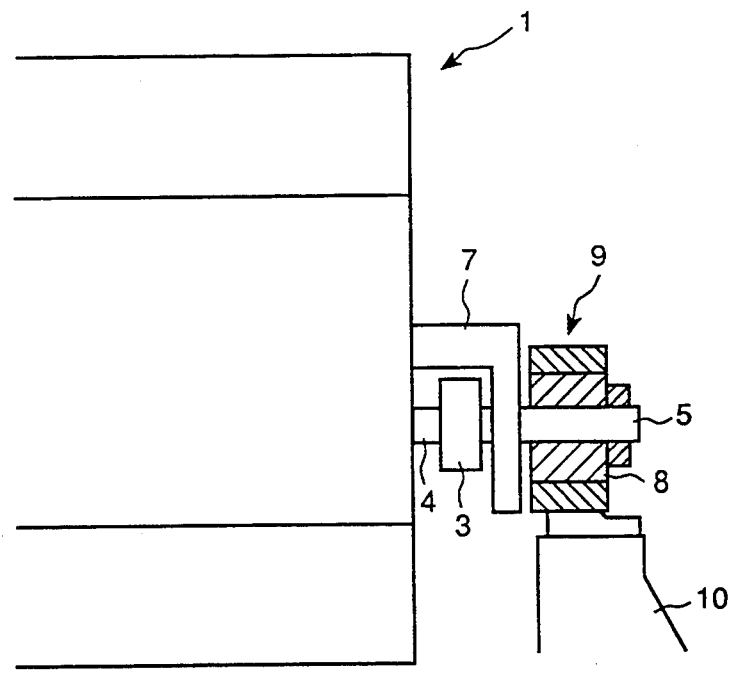
FIG. 5 is a schematic illustration showing a mounting structure of the power plant at the front end.
Figure 6:
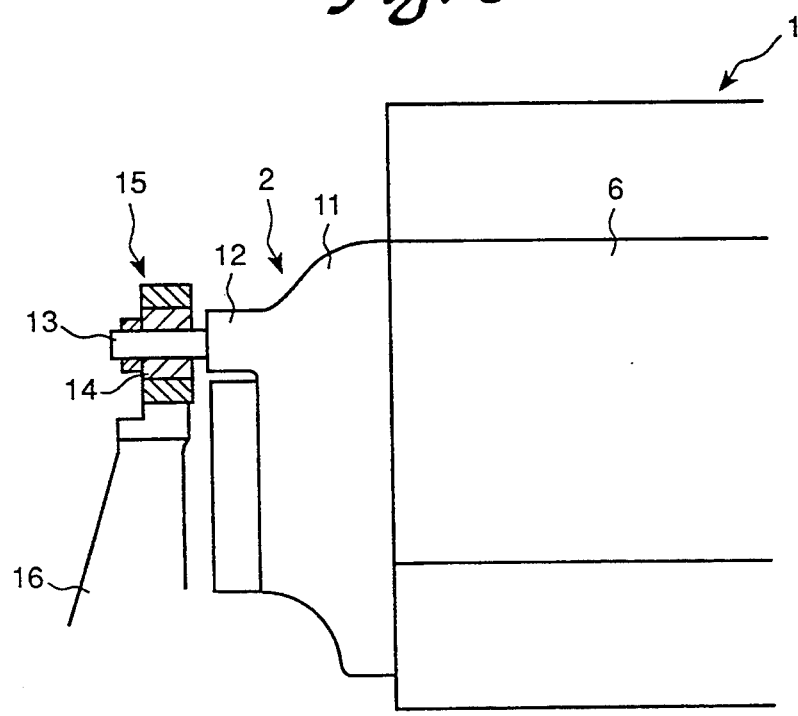
FIG. 6 is a schematic illustration showing a mounting structure of the power plant at the rear end.

Referring to FIGS. 5 and 6, practical structures for crankshaft side mounting and output side mounting are shown by way of example. The crankshaft side mounting structure, shown in FIG. 5, has its optimal mount position placed in and axial line of an engine crank shaft 4 of the engine 1. An external portion of the engine crankshaft 4 mounts thereon a camshaft sprocket or pulley 3. The engine 1 is provided with a crankshaft side mounting shaft 5, which is formed integrally with the engine crankshaft 4 as a crankshaft extension. The crankshaft side mounting shaft 5 is supported for rotation by means of a mount bracket 7 secured to an engine block 6 so as to bear the crankshaft pulley 4 on opposite sides of the pulley 4. A crankshaft side mount 9 is fitted onto the leading end portion of the crankshaft side mounting shaft 5 through a mount rubber sleeve 8 and is secured or fixed to a frame mount bracket 10 forming part of the vehicle body (not shown). Similarly, as shown in FIG. 6, the output side mounting structure includes a mounting flange 12, which is formed on a clutch housing 11 of the transmission 2 so as to protrude from the output side end of the power plant PW. An output side mount 15, which is equipped with a mount rubber 14, is attached to the end of a mounting shaft 13 attached to the mounting flange 12 and supported or fixed by a frame mount bracket 16 forming part of the vehicle body.

As shown in FIGS. 1 and 2, in addition to the lateral side mount brackets 10 and 16, there is a mount bracket 21 with a rubber bush 22 by which the power plant PW is supported or fixed on a lower vehicle frame 20 at a lower rear end of the engine 2.

The unique mounting structure of this invention enables a simultaneous reduction in idling vibrations and power plant bending (PPB) vibrations. In this instance, since power plant bending (PPB) vibrations have high resonance frequencies, which have less affect on the generation of confined or buzzing sound or noises within the vehicle compartment, it is possible to establish the mounting positions while taking account of a reduction in vibrations, particularly idling vibrations. In addition, supporting a pulley by means of the mount bracket 7 on one side and the engine body 6 on the other side thereof realizes an improved supporting rigidity. Providing the mounting flange 12 to the clutch housing 11 of the transmission increases the bending rigidity of the clutch housing and, furthermore, causes a reduction in vibration of the clutch housing so as to decrease noises.

It is to be understood that although the present invention has been described in detail with respect to a preferred embodiment thereof, various other embodiments and variants may occur to those skilled in the art. Such other embodiments and variants falling within the scope and spirit of the invention are intended to be covered by the following claims.

What is claimed is:

1. In a mounting structure for mounting a power plant having an engine and a transmission, which are adjacently disposed transversely in a vehicle body so as to place an engine output shaft and a transmission output shaft in parallel to each other, the improvement comprising:

a crankshaft side mount interconnecting said power plant within said vehicle body; and an output side mount interconnecting said power plant with said vehicle body;

the crankshaft side mount and the output side mount together defining the mounting structure and disposed so that the mounting structure has mounting positions on opposite sides in a transverse direction of the power plant which are located within triangles, one of said triangles being defined on one transverse side of the power plant by a point on a primary inertial axis of the engine, a point at a node on said one transverse side of power plant bending vibrations, and a point defined by intersection of a vertical line which passes through said primary inertial axis of the engine and a horizontal line which passes through said node on said one transverse side, another of said triangles being defined on another transverse side of the power plant by a point on a primary inertial axis of the transmission, a point at a node on said other transverse side of power plant bending vibrations, and a point defined by intersection of a vertical line which passes through said primary inertial axis of the transmission and a horizontal line which passes through said node on said other transverse side.

2. An improvement in a mounting structure for a power plant as defined in claim 1, wherein each of said mounting positions is established close to one of the vertical lines within one of said triangles.

3. An improvement in a mounting structure for a power plant as defined in claim 1, and further comprising a pulley mounted on said engine output shaft with one side adjacent the engine and one side remote from the engine, at least one of said mounting positions being established on an axis of said engine output shaft.

4. An improvement in a mounting structure for a power plant as defined in claim 3, wherein said at least one of said mounting positions is located on the side of said pulley remote from said engine.

5. An improvement in a mounting structure for a power plant as defined in claim 1, wherein at least one of said mounting positions is established adjacent to said transmission opposite to said engine output shaft.

6. An improvement in a mounting structure for a power plant as defined in claim 5, wherein said transmission is formed with a mounting flange to which said output side mount is connected.

* * * * *